(12) United States Patent
Claudatos et al.

(10) Patent No.: US 7,647,410 B2
(45) Date of Patent: Jan. 12, 2010

(54) NETWORK RIGHTS MANAGEMENT

(75) Inventors: Christopher H. Claudatos, San Jose, CA (US); Magnus B. Hansen, Fremont, CA (US)

(73) Assignee: Procera Networks, Inc., Los Gatos, CA (US)

(*) Notice: Subject to any disclaimer, the term of this patent is extended or adjusted under 35 U.S.C. 154(b) by 1582 days.

(21) Appl. No.: 10/650,456

(22) Filed: Aug. 27, 2003

(65) Prior Publication Data

US 2004/0139206 A1  Jul. 15, 2004

Related U.S. Application Data

(60) Provisional application No. 60/406,713, filed on Aug. 28, 2002.

(51) Int. Cl.
G06F 15/16 (2006.01)
(52) U.S. Cl. ........................ 709/229; 709/223; 709/224
(58) Field of Classification Search ................. 709/223, 709/224, 229
See application file for complete search history.

(56) References Cited

U.S. PATENT DOCUMENTS 6,732,184 B1 * 5/2004 Merchant et al. ............ 709/238
6,941,472 B2 * 9/2005 Moriconi et al. .............. 726/11

* cited by examiner

*Primary Examiner*—Vivek Srivastava
*Assistant Examiner*—Adnan Mirza
(74) *Attorney, Agent, or Firm*—Fish & Richardson P.C.

(57) ABSTRACT

Methods and apparatus, including computer program products, implement techniques of processing data packets in a computer network. The computer network includes a multi-port network device and a computer executing a software application. The multiport network device is configured to receive data packets to be transmitted using the computer network and the network device stores one or more authorized network descriptors. The software application generates data packets to be transmitted to the computer network through the network device. The software application registers the network rights descriptor with the network device and inserts the network rights descriptor in each generated data packet. The network device is configured to discard the data packet if the network rights descriptor in the data packet does not match an authorized network rights descriptor and to process the data packet if the network rights descriptor in the data packet matches an authorized network rights descriptor.

21 Claims, 5 Drawing Sheets

NETWORK RIGHTS MANAGEMENT

CROSS-REFERENCE TO RELATED APPLICATIONS

This application claims priority based on U.S. Provisional Application Ser. No. 60/406,713 for "Managing and Controlling User Applications with Network Switches", filed Aug. 28, 2002, the disclosure of which is incorporated here by reference in its entirety.

BACKGROUND

The present invention relates to network switching, and more particularly to Layer 2 through Layer 7 switching.

This invention relates to uses for network switches, and more particularly to filters and policies for managing and controlling user applications using network switches.

The OSI (Open System Interconnection) Model is an ISO standard for worldwide communications that defines a networking framework for implementing protocols in seven layers. Control is passed from one layer to the next, starting at the applications layer in one station, proceeding to the physical layer and back up the hierarchy.

The layers are defined as:

Applications Layer 7 provides interface to end-user processes and standardized services to applications.

Presentation Layer 6 specifies architecture-independent data transfer format, encodes and decodes data, encrypts and decrypts data, compresses data.

Session Layer 5 manages user sessions and reports upper-layer errors.

Transport Layer 4 manages network layer connections and provides reliable packet delivery mechanism.

Network Layer 3 addresses and routes packets.

Data Link Layer 2 frames packets and controls physical layer data flow.

Physical Layer 1 interfaces between network medium and network devices. Also defines electrical and mechanical characteristics.

SUMMARY OF THE INVENTION

The present invention provides methods and apparatus, including computer program products, for processing data packets in a computer network, the data packets including information from one or more of Layers 2 through 7 of the OSI model.

In one aspect the invention is directed to a computer network. The computer network includes a multiport network device and a computer executing a software application. The multiport network device receives data packets to be transported using the computer network and the network device stores one or more authorized network descriptors. A software application generates data packets to be transported to the computer network through the network device. The software application registers a network rights descriptor with the network device and inserts the network rights descriptor in each generated data packet. The network device is configured to discard data packet, if the network rights descriptor in the data packet does not match an authorized network rights descriptor and to process the data packet if the network rights descriptor in the data packet matches an authorized network rights descriptor.

Implementations of the invention can include one or more of the following features. The network device can store one or more authorized network descriptors. The network descriptors can be stored in a known location connected to the computer network and the network device can be configured to retrieve authorized network descriptors from the known location. The network device can be configured to retrieve authorized network descriptors from an authentication server. The network device can store one or more user defined packet policies and it can be configured to perform an action from a user defined packet policy that matches the network rights descriptor. The network device can be configured to route the data packet using a layer 2-3 switch. The network rights descriptor can include an application rights descriptor, a content rights descriptor and an enterprise rights descriptor. The network rights descriptor can be encrypted. The network device can be configured to process the data packet at wire speed. The network device can also be configured to block the discarded data packets from utilizing the computer network, redirect the discarded data packets, and log the discarded data packets.

In another aspect, the invention is directed to a computer network including a first multiport network device and a second multiport network device. The first multiport network device receives data packets to be transmitted using the computer network. The first network device inserts a local network descriptor in each data packet transmitted by the first network device. The second network device receives data packets from the computer network and the second network device stores one or more authorized local network descriptors. The second network device is configured to discard the data packet if the local network descriptor in the data packet does not match an authorized local network descriptor and to process the data packet of the local network descriptor in the data packet matches an authorized local network descriptor.

Implementations of the invention can include one or more of the following features. The one or more authorized network descriptors can be stored in the second network device. The authorized network descriptors can be stored in a known location connected to the computer network and the second network device can be configured to retrieve the authorized network descriptors. The second network device can be configured to retrieve the authorized network descriptors from an authentication server. The second network device can store one or more user defined packet policies and it can be configured to perform an action from a user defined packet policy that matches the network rights descriptor. The second network device can be configured to route the data packet using a layer 2-3 switch. The network rights descriptor can be encrypted. The first network device can be configured to process the data packet at wire speed. The second network device can be configured to process the data packet at wire speed. The second network device can be configured to block discarded data packets from utilizing the computer network, redirect discarded data packets, and log discarded data packets. The second network device can be configured to strip the local network descriptor before processing the data packet, if the data packet has a destination external to the computer network.

In another aspect, the invention is directed to a method for storing one or more authorized network descriptors at a multiport network device. The data packets are generated at a software application, and the data packets are transmitted to the computer network through the network device. The software application inserts a network rights descriptor in each generated data packet. The network device receives input identifying the network rights descriptor as an authorized network rights descriptor. If the network rights descriptor in the data packet matches an authorized network rights descriptor, the data packet is processed at the network device. If the network rights descriptor in the data packet does not match an authorized network rights descriptor, the data packet is discarded.

The invention can be implemented to realize one or more of the following potential advantages. Marking locally generated packets using a local network descriptor allows local packets to be distinguished from spoofed packets. Identification of locally generated traffic provides greater security from unauthorized utilization of the network and protects against unauthorized network traffic. Application rights descriptors can be used to allow only authorized applications to utilize the network, and to prevent spoofing of authorized applications. Application rights descriptors can also be used to enforce software license agreements, enforce copyright restrictions, prevent illegal copies of applications from running on the network, and limit the number of users for a software application. Content rights descriptors can be used to enforce a set of rights associated with the content by preventing unauthorized content from utilizing the network. Enterprise rights descriptors can be used to implement enterprise-specific policies for network utilization. One implementation of the invention can provide all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
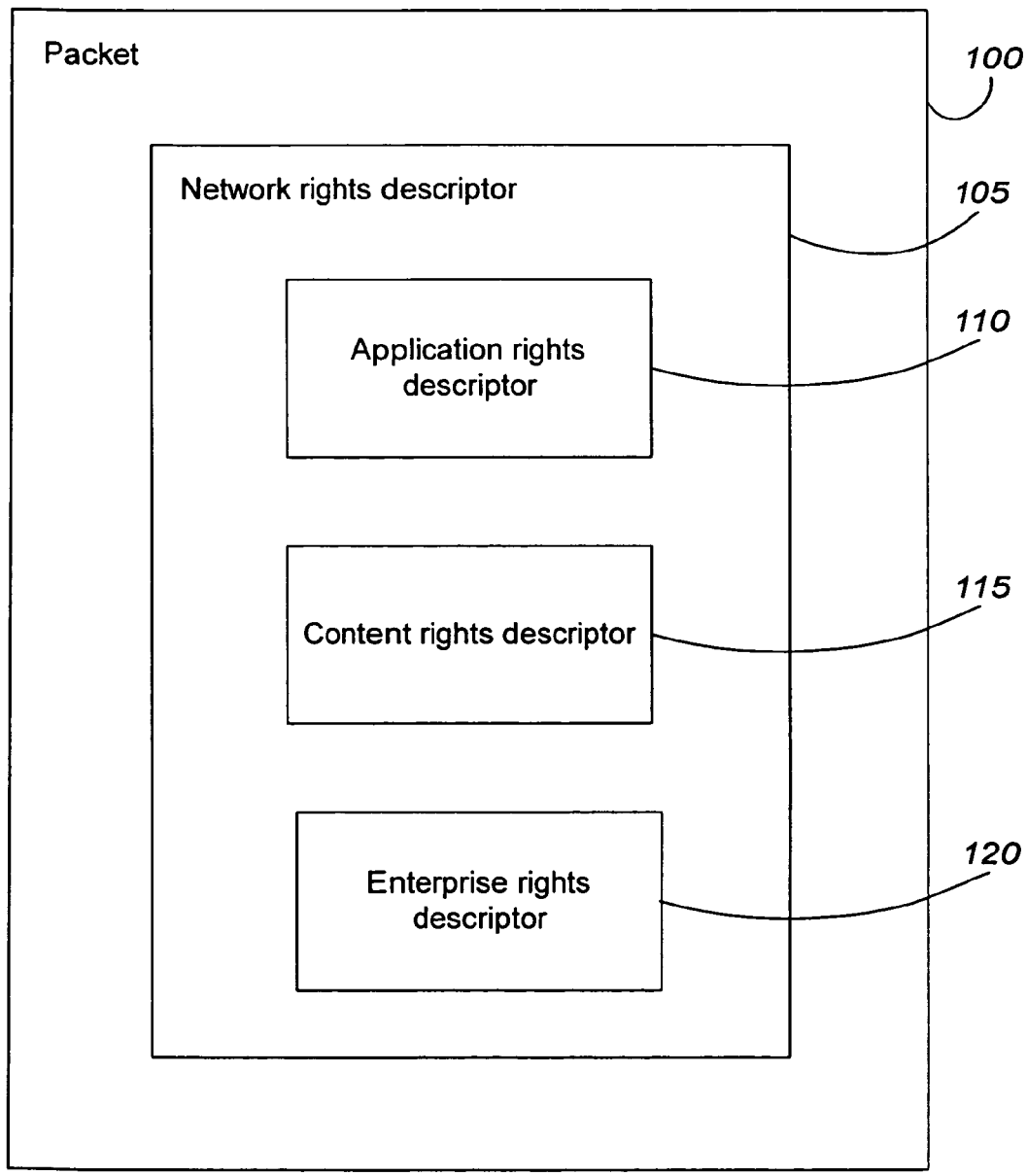
FIG. 1 is a conceptual block diagram of a data packet 100 including a network rights descriptor.

FIG. 1 is a conceptual block diagram of a data packet 100 including a network rights descriptor 105. The network rights descriptor 105 can be inserted in a known location in the data packet. The network rights descriptor 105 can also be inserted in a reserved or unused portion of the packet header. The network rights descriptor 105 can be used to identify data packets that are authorized to use network resources. The network rights descriptor 105 can also be used to identify the originator of the data packet, including the identification of locally generated data packets. The network rights descriptor 105 can include an application rights descriptor 110, a content rights descriptor 115, and an enterprise rights descriptor 120.

The application rights descriptor is used to include information regarding a software application, device, or network appliance generating the data packet. The application rights descriptor can include an application signature inserted by the software application, where the application signature uniquely identifies the software application. Application signatures can also include information identifying a user or a workstation generating the data packet, date and time when the data packet was generated, and license information for the software application. To ensure the legitimacy of the application signature the application signature can be encoded and optionally encrypted and created dynamically at the time the application is first installed or each time the application is run. In one implementation, the application descriptor includes license information for the software application generating the data packet, and the license information is used to enforce the terms of a software license agreement for the software application (e.g. a maximum number of users running the software application at any time). The license information can also be used to only allow data packets generated by a software application having a valid license to use network resources. In an alternate implementation, the application rights descriptor includes information identifying a storage device at the user workstation that was used to generate the data packet, and only data packets originating from authorized storage devices are permitted to use network resources. The information identifying the storage device used to generate the data packets can be used to prevent a user from attaching a portable storage device (e.g. a portable hard drive, or a ZIP drive) to a user workstation and transporting data contained in the portable storage device using network resources.

The content rights descriptor is used to include information in the data packet that is specific to digital information contained in the data packet. The content rights descriptor identifies the type of content, e.g., text, graphics, audio, video, electronic documents, computer program instructions, and other data or information, and a set of associated rights. Each right in the set specifies one or more permitted actions for the data packet that can be authorized using that right. Optionally, the set of rights can specify conditions on performing the permitted actions. For example, a data packet containing a video clip can be associated with a content rights descriptor that specifies viewing rights. The viewing rights can specify the user or the workstation that can be used to view the video clip. Optionally, conditions on the viewing rights can specify, e.g., a limited time period, or a limited number of times for viewing the video clip. The viewing rights can also restrict the user receiving the video clip from transmitting the video clip to another user, and this restriction can be enforced using the content rights descriptor.

The enterprise rights descriptor is used to include enterprise specific information in the data packet. The enterprise rights descriptor can include information identifying an origin of the data packet. For example, the enterprise rights descriptor can be used to identify the copyright owner and the software licensee of the software application that generated the data packet, the patent owner and licensee of the user workstation used to generate the data packet, the copyright owner and the licensee of the operating system running on the user workstation used to generate the data packet, and the end-user of the application software used to generate the data packet. Alternatively, the enterprise rights descriptor can include information operable to determine if the data packet is a native packet that originated within an enterprise network, or if the data packet is a foreign packet that originated outside the enterprise network. The enterprise rights descriptor can also be used to specify and manage network bandwidth allocated to the data packet. For example, the enterprise rights descriptor can specify a bandwidth allocation for the data packet, a maximum or a minimum bandwidth allocation for the data packet, and a priority for the data packet.

Figure 2:
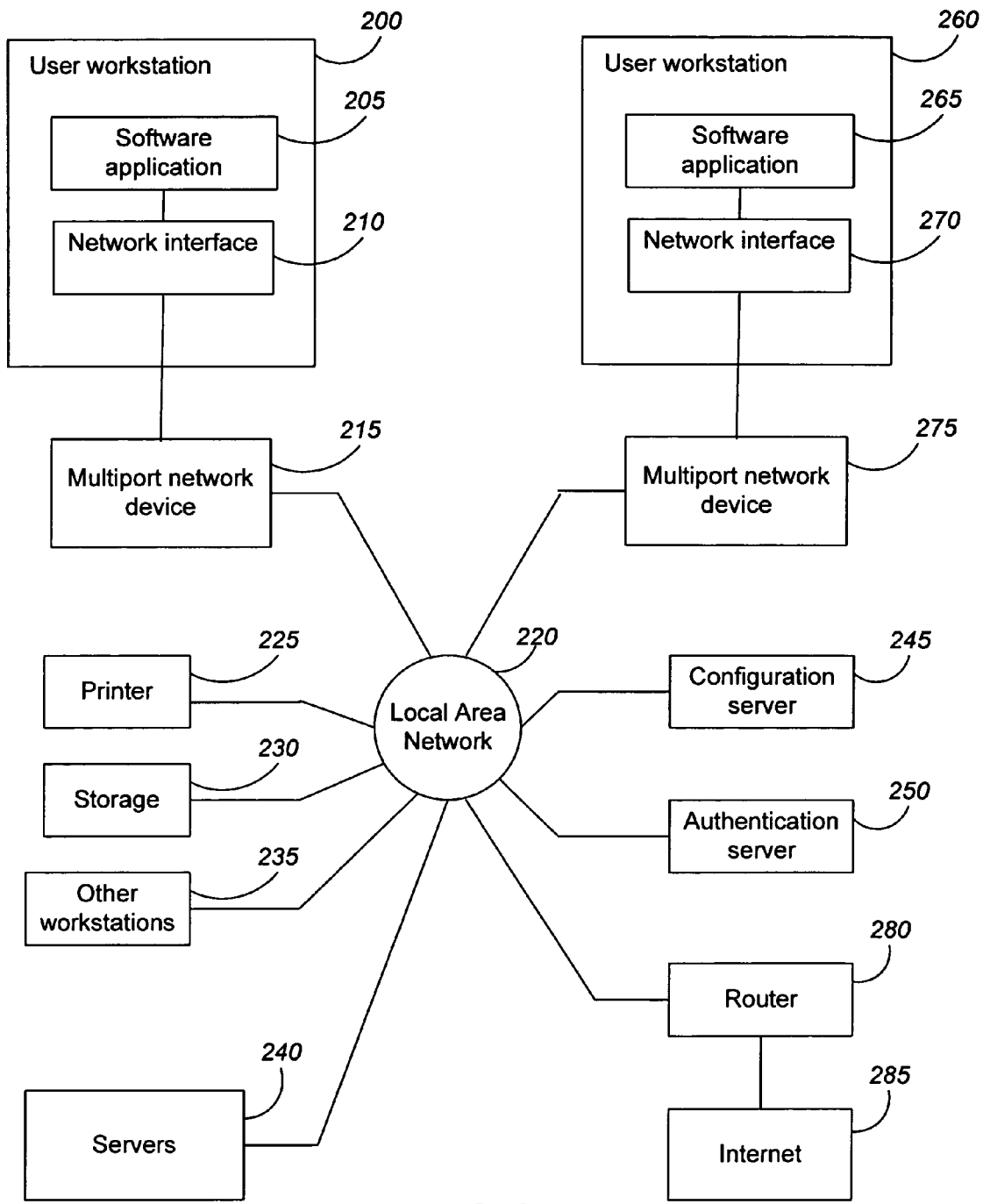
FIG. 2 is a conceptual block diagram of a user workstation connected to a local area network.

FIG. 2 illustrates a conceptual block diagram of a user workstation 200 connected to a local area network 220. The local area network 220 is connected to the Internet 285 through a router 280. The user workstation 200 can be connected to a number of devices using the local area network 220, e.g., printers 225, storage devices 230, and other workstations 235. A configuration server 245 and an authentication server 250 can also be connected to the network 220. A software application 205, running on the user workstation 200, generates data packets to be transmitted using the network 220 and receives data packets from the network 220. The devices connected to the network 220 can transmit data packets to the software application 205 using the network 220. The software application 205 transmits and receives data packets through a network interface 210 in the user workstation 200. The network interface 210 connects the user workstation 200 to the network 220 through a multiport network device 215. The network device 215 has three or more ports, and is dedicated to communicating data packets between the ports. Each port of the network device can transmit and receive data packets. The network device 215 can be a network switch, multi-layer switch, or a router. The network device is not a general purpose computing device. Techniques for implementing a multi-layer switch are described in U.S. application Ser. No. 10/445,293, titled "Switch for Local Area Network," to Sean Hou, William R. Ge, Daniel Yin Yung Ching, Keith M. Andrews, Christopher H. Claudatos, and Magnus B. Hansen, filed on May 22, 2003, which is incorporated by reference herein.

A second user workstation 260 is connected to the local area network 220 through a multiport network device 275. A software application 265, running on the user workstation 260, generates data packets to be transmitted using the network 220 and receives data packets from the network 220. The software application 265 transmits and receives data packets through a network interface 270 in the user workstation 260. The network interface 270 connects the user workstation 260 to the network 220 through the multiport network device 275.

Figure 1A:
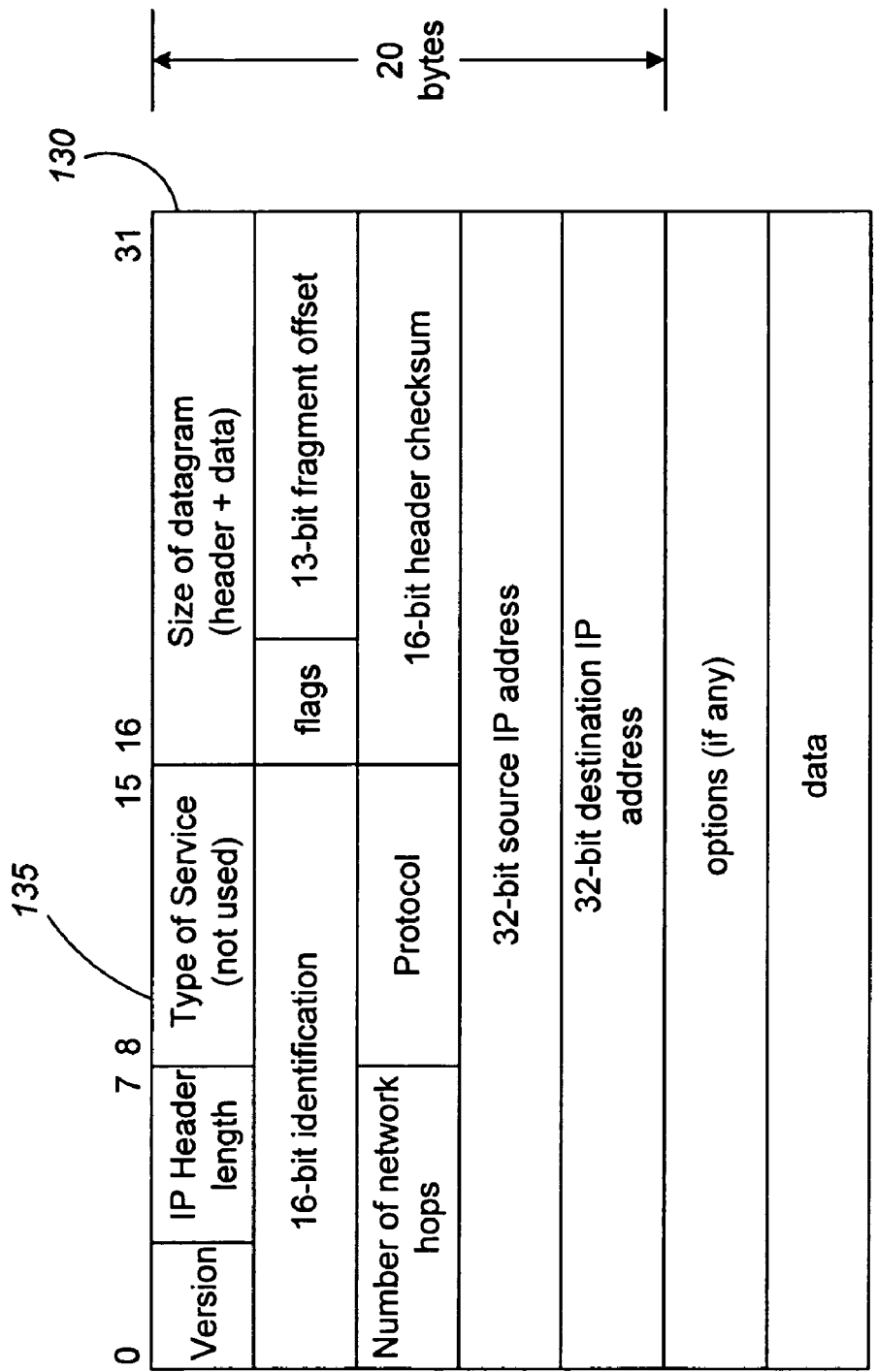
FIG. 1A illustrates an IP header included in the data packet.
Figure 3:
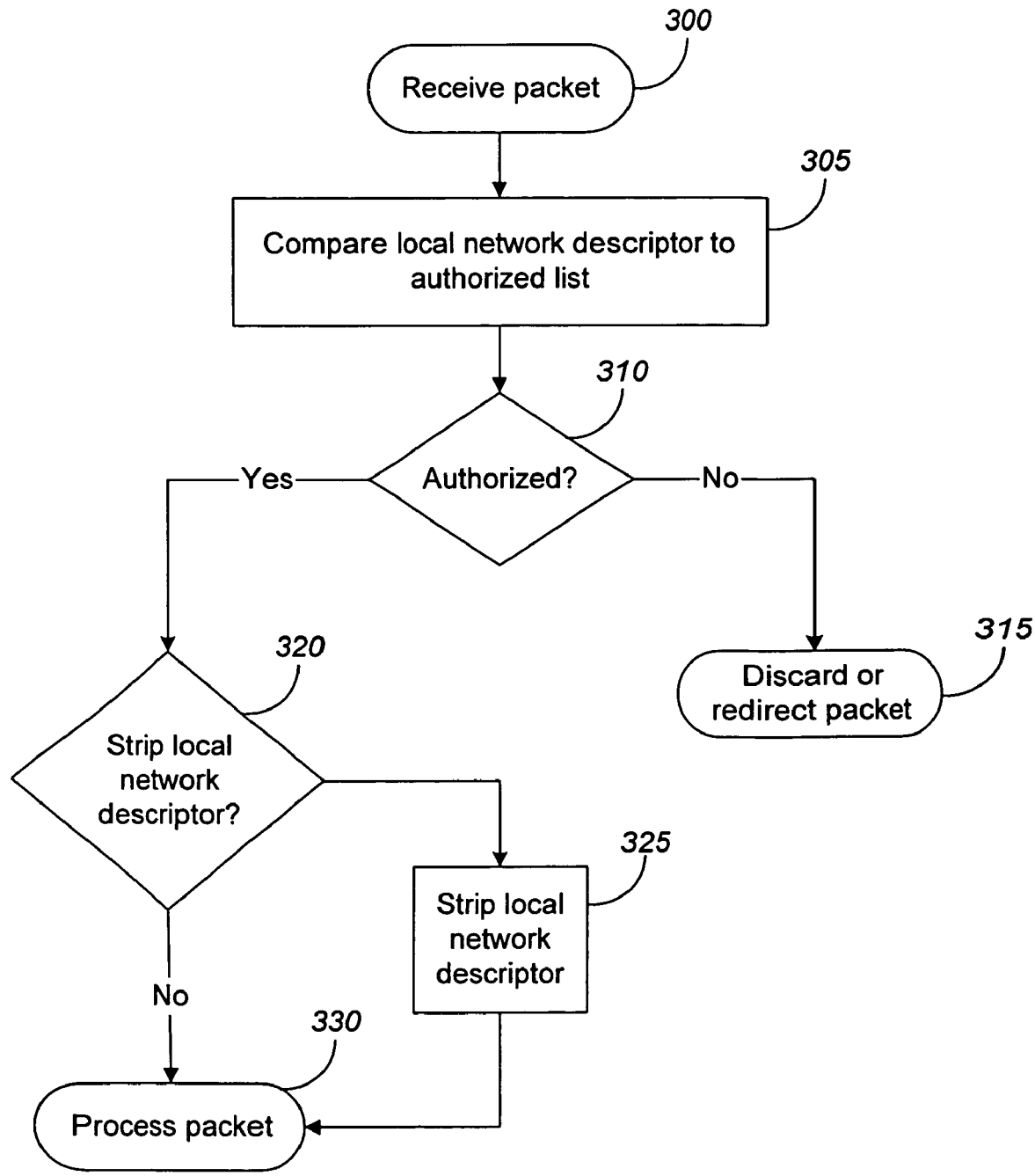
FIG. 3 is a flow diagram illustrating a method for preventing unauthorized utilization of the network by marking packets using a local network descriptor.

FIG. 3 is a flow diagram illustrating a method for preventing unauthorized utilization of the network 220 by marking packets using a local network descriptor. The local network descriptor is a predefined network rights descriptor 105, or one of a set of predefined network descriptors 105, used to identify the locally generated packets. The local network descriptor is inserted in the known or reserved portion of the packet header, or in a portion of the data packet other than the packet header. In one implementation, the data packet includes an IP header 130 (FIG. 1A). The Type of Service (ToS) field 135 (FIG. 1A) of the IP header, also referred to as the Differentiated Services Code Point (DSCP), is typically not used. A part of the ToS field 135 or the entire ToS field 135 can be used to insert the local network descriptor. In one implementation, six bits of the ToS field are used to insert the local network descriptor. The local network descriptor can be inserted by the software application 205 generating the data packet, the network interface 210 transmitting the generated data packet, or the network device 215 receiving the generated data packet from a trusted network interface 210. The local network descriptor can be encoded and optionally encrypted using a predefined encryption algorithm. In one implementation, the network device 215 inserts the local network descriptor in all data packets received or transmitted through a physical port on the network device 215, thereby marking these data packets as known packets.

Referring to FIG. 2, data packets are transmitted from user workstation 200 to user workstation 260. The data packets are generated by the software application 205 and transmitted through the network device 215, using the network 220. The data packets are received by the network device 275 and communicated to the software application 265. The network device 215 inserts local network descriptor in the data packet and before transmitting the data packet through the network 220.

The data packets are received at the network device 275 (step 300), and the local network descriptor is compared to a list of authorized local network descriptors (step 305). If the local network descriptor is encrypted using a predefined encryption algorithm, the network device 275 decrypts the local network descriptor in step 305. A list of authorized local network descriptors, specified by a user or network administrator, is used to specify data packets authorized to utilize the network 220. The list of authorized local network descriptors can be stored in the network device 215, or it can be stored on some other device connected to the network 220, e.g., the configuration server 245. The network device 215 can also use an authentication server connected to the network 220, e.g., the authentication server 250, or a remote authentication server that is not directly connected to the network 220 to determine whether the local network descriptor is an authorized local network descriptor. If the local network descriptor is not an authorized local network descriptor ("no" branch of decision step 310), the data packet is discarded or redirected for further processing. In one implementation, discarded data packets are redirected to applications running on the network device 215. In an alternative implementation, discarded data packets can be redirected to a specific port for logging, reporting, and surveillance.

In order to enhance network security the local network descriptor can be stripped from data packets being transmitted to a destination outside the network 220, e.g., the Internet 285, or before the data packets are presented to the software application 265. Stripping the local network descriptor prevents entities outside the network 220 from observing and copying the local network descriptor to potentially generate spoofed packets. If the local network descriptor included in the data packet is an authorized local network descriptor ("yes" branch of decision step 310), the method determines if the local network descriptor should be stripped from the data packet (step 320). If the local network descriptor should be stripped ("yes" branch of decision step 320), the data packet is processed (step 330) after stripping the local network descriptor (step 325). If the local network descriptor does not have to be stripped ("no" branch of decision step 320), the data packet is processed as received (step 330). In one implementation, a local network descriptor inserted by a device can only be stripped by a receiving device of the same type as the inserting device, e.g., a receiving network device 215 can only strip local network descriptors inserted by a network device 215, and a receiving network interface 210 can only strip local network descriptors inserted by a network interface 210.

Figure 4:
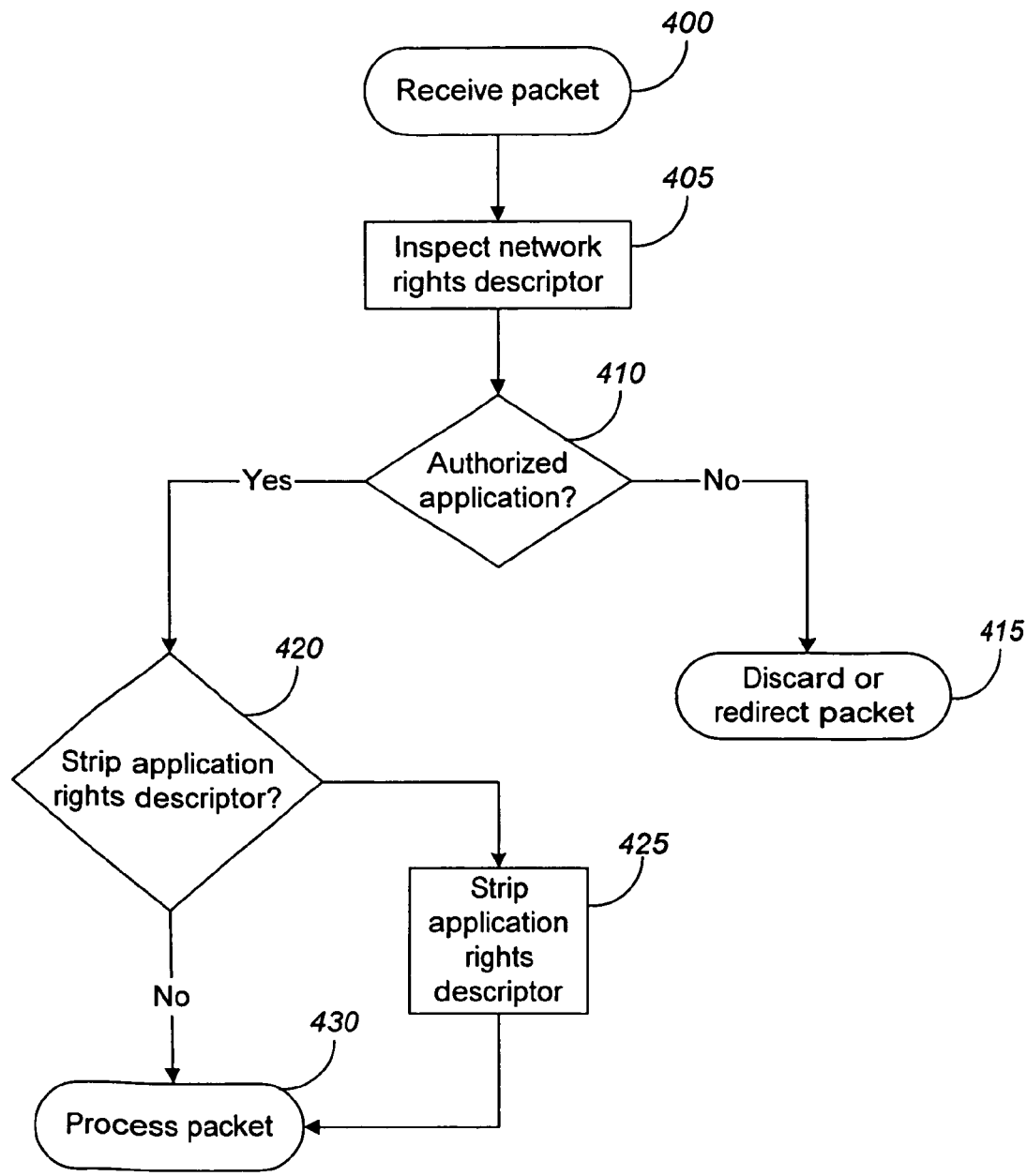
FIG. 4 is a flow diagram illustrating a method for preventing unauthorized applications from utilizing the network.

FIG. 4 is a flow diagram illustrating a method for preventing unauthorized applications from utilizing the network 220. The method requires that software applications 205 utilizing the network 220 insert an application descriptor in data packets generated by the software application 205. In one implementation, a part of the ToS field 135 (FIG. 1A) or the entire ToS field 135 can be used to insert the application descriptor. In one implementation, six bits of the ToS field are used to insert the application descriptor. In one implementation, the software applications 205 pre-register with the network device 215 and provide information required by the network device 215 to locate the application descriptor in the data packet. Pre-registration can also provide other information needed by the network device 215 to extract information from the application descriptor, e.g., whether the application descriptor is encrypted, and the format of the information contained in the application descriptor. In an alternative implementation, the network device 215 has the required information for all software applications 205 authorized to run on the network 220 and pre-registration is not required.

In FIG. 4, the data packets are received at the network device 215 (step 400), and the network rights descriptor 105 is inspected (step 405) to determine if the network rights descriptor 105 is an authorized application rights descriptor (step 410). If the application rights descriptor is encrypted using a predefined encryption algorithm, the network device 215 decrypts the application rights descriptor before inspection. A list of authorized application rights descriptors, specified by a user or a network administrator, can be used to specify applications authorized to utilize the network 220. The list of authorized application rights descriptors can be stored in the network device 215. The network device 215 can retrieve the list of authorized application rights descriptors from another device, and store the retrieved list either persistently or temporarily. The list can be stored on some other device connected to the network 220, e.g., the configuration server 245. The network device 215 can also use an authentication server connected to the network 220, e.g., the authentication server 250, or a remote authentication server that is not directly connected to the network 220 to determine whether the application rights descriptor is an authorized application rights descriptor. If the application rights descriptor is not an authorized application rights descriptor ("no" branch of decision step 410), the data packet is discarded or redirected for further processing. In one implementation, discarded data packets are redirected to applications running on the network device 215. In an alternative implementation, discarded data packets can be redirected to a specific port for logging, reporting, and surveillance.

The application rights descriptor can be stripped for data packets being transmitted to a destination outside the network 220 or before the data packets are presented to a software application 205. Stripping the application rights descriptor prevents entities outside the network 220 from observing and copying the application rights descriptor to potentially generate spoofed packets. If the application rights descriptor included in the data packet is an authorized application rights descriptor ("yes" branch of decision step 410), the method determines if the application rights descriptor should be stripped from the data packet (step 420). If the application rights descriptor should be stripped ("yes" branch of decision step 420), the data packet is processed (step 430) after stripping the application rights descriptor (step 425). If the application rights descriptor does not have to be stripped ("no" branch of decision step 420), the data packet is processed as received (step 430).

Processing the data packet includes routing the data packet using a multi-layer switch. Processing the packet also includes allocating bandwidth, specifying a minimum bandwidth, and specifying a maximum bandwidth for the data packet. Processing the packet can also include redirecting the packet to another port of the network device 215 processing the data packet, redirecting the data packet to another device connected to the network 220, mirroring the packet to a particular physical port of the network device 215, prioritizing the data packet, and counting discarded data packets. The network device 215 receiving the data packet can also modify the network rights descriptor for the data packet, or add a secondary network rights descriptor to the data packet. The secondary or modified network rights descriptor is used in the same manner as the original network rights descriptor. In one implementation, the network device 215 is a multi-layer switch that processes the data packet according to user-defined packet policies for the network rights descriptor contained in the data packet.

Data packets can be marked with network rights descriptors based on additional parameters such as source IP address, destination IP address, MAC address, time of day, traffic content, traffic type (e.g., voice, video, documents, graphics, file types), VLAN tag, device ID, encrypted key, and application source. These network rights descriptors can be processed in a manner similar to application rights descriptors in FIG. 4 to implement user-defined policies based on the additional parameters.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network.

The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer network comprising:
   a multiport network device to receive data packets to be transmitted using the computer network, the network device storing one or more authorized network descriptors; and
   a computer executing a software application, the software application generating data packets to be transmitted to the computer network through the network device, the software application registering a network rights descriptor with the network device, the software application inserting the network rights descriptor in each generated data packet;
   wherein the network device is configured to discard the data packet if the local network rights descriptor in the data packet does not match an authorized local network rights descriptor, to determine whether the local network rights descriptor should be stripped from the data packet if the local network rights descriptor in the data packet matches an authorized network rights descriptor, and to process the data packet after the determination, wherein the network rights descriptor comprises an application rights descriptor, a content rights descriptor, and an enterprise rights descriptor, wherein the application rights descriptor is used to include information regarding a software application, device, or network appliance generating the data packet.

2. The computer network of claim 1, wherein:
   the one or more authorized network descriptors are stored persistently in the network device.

3. The computer network of claim 1, wherein:
   the one or more authorized network descriptors are stored in a device connected to the computer network, and the network device is configured to retrieve the authorized network descriptors from the device.

4. The computer network of claim 1, wherein: the network device is configured to retrieve the authorized network descriptors from an authentication server.

5. The computer network of claim 1, wherein:
   the network device stores one or more user defined packet policies, and is configured to perform an action from a user defined packet policy that matches the network rights descriptor.

6. The computer network of claim 1, wherein:
   the network device is configured to route the data packet using a layer 2-3 switch.

7. The computer network of claim 1, wherein: the network rights descriptor is encrypted.

8. The computer network of claim 1, wherein: the network device is configured to process the data packet at wire-speed.

9. The computer network of claim 1, wherein:
   the network device is configured to block discarded data packets from utilizing the computer network, redirect discarded data packets, and log discarded data packets.

10. A computer network comprising:
    a first multiport network device to receive data packets to be transmitted using the computer network, the first network device inserting a local network descriptor in each data packet transmitted by the first network device;
    a second network device to receive data packets from the computer network, the second network device storing one or more authorized local network descriptors;
    wherein the second network device is configured to discard the data packet if the local network descriptor in the data packet does not match an authorized local network descriptor, and to determine whether the local network descriptor should be stripped from the data packet if the local network descriptor in the data packet matches an authorized local network descriptor, and to process the data packet after the determination, wherein the network rights descriptor comprises an application rights descriptor, a content rights descriptor, and an enterprise rights descriptor, wherein the application rights descriptor is used to include information regarding a software application, device, or network appliance generating the data packet.

11. The computer network of claim 10, wherein: the one or more authorized network descriptors are stored persistently in the second network device.

12. The computer network of claim 10, wherein:
    the one or more authorized network descriptors are stored in a device connected to the computer network, and the second network device is configured to retrieve the authorized network descriptors from the device.

13. The computer network of claim 10, wherein: the second network device is configured to retrieve the authorized network descriptors from an authentication server.

14. The computer network of claim 10, wherein the second network device stores one or more user defined packet policies, and is configured to perform an action from a user defined packet policy that matches the network rights descriptor.

15. The computer network of claim 10, wherein:
    the second network device is configured to route the data packet using a layer 2-3 switch.

16. The computer network of claim 10, wherein: the network rights descriptor is encrypted.

17. The computer network of claim 10, wherein: the first network device is configured to process the data packet at wire-speed.

18. The computer network of claim 10, wherein:
    the second network device is configured to process the data packet at wire-speed.

19. The computer network of claim 10, wherein:
    the second network device is configured to block discarded data packets from utilizing the computer network, redirect discarded data packets, and log discarded data packets.

20. The computer network of claim 10, wherein the second network device is configured to strip the local network descriptor before processing the data packet, if the data packet has a destination external to the computer network.

21. A method for processing data packets in a computer network, comprising:
    storing one or more authorized network descriptors at a multiport network device;

generating data packets at a software application, the data packets to be transmitted to the computer network through the network device;

inserting a network rights descriptor in each generated data packet with the software application;

receiving input at the network device identifying the network rights descriptor as an authorized network rights descriptor;

receiving a data packet at the network device, the data packet including information from one or more of Layers 2 through 7 of the OSI model;

if the network rights descriptor in the data packet matches an authorized network rights descriptor, processing the data packet at the network device; and if the network rights descriptor in the data packet does not match an authorized network rights descriptor, discarding the data packet, wherein the network rights descriptor comprises an application rights descriptor, a content rights descriptor, and an enterprise rights descriptor, wherein the application rights descriptor is used to include information regarding a software application, device, or network appliance generating the data packet.

* * * * *